H. A. W. WOOD.
STEREOTYPE PLATE FINISHING MACHINE.
APPLICATION FILED OCT. 23, 1909. RENEWED JUNE 24, 1918.
1,281,115.
Patented Oct. 8, 1918.
6 SHEETS—SHEET 6.
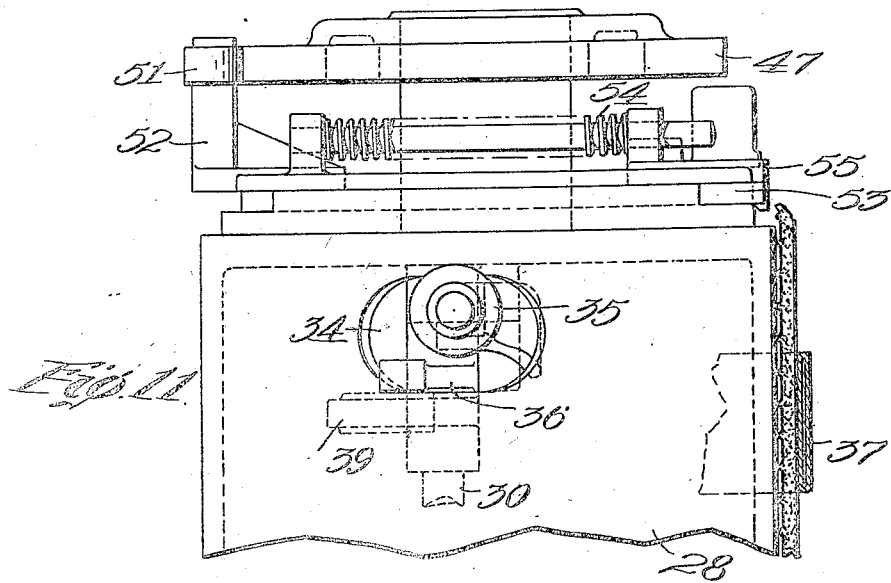
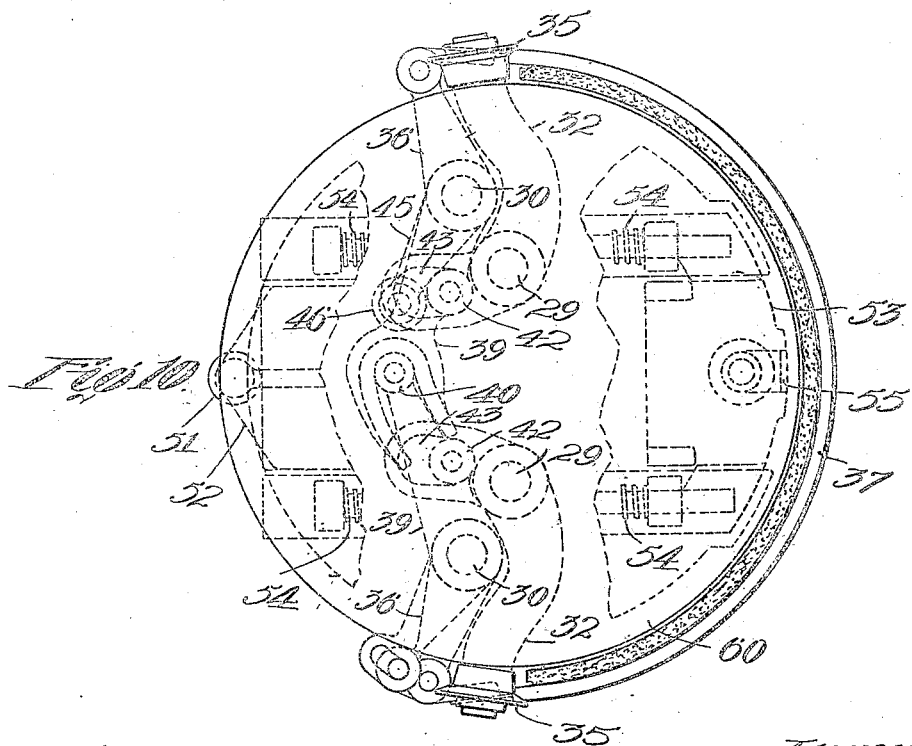

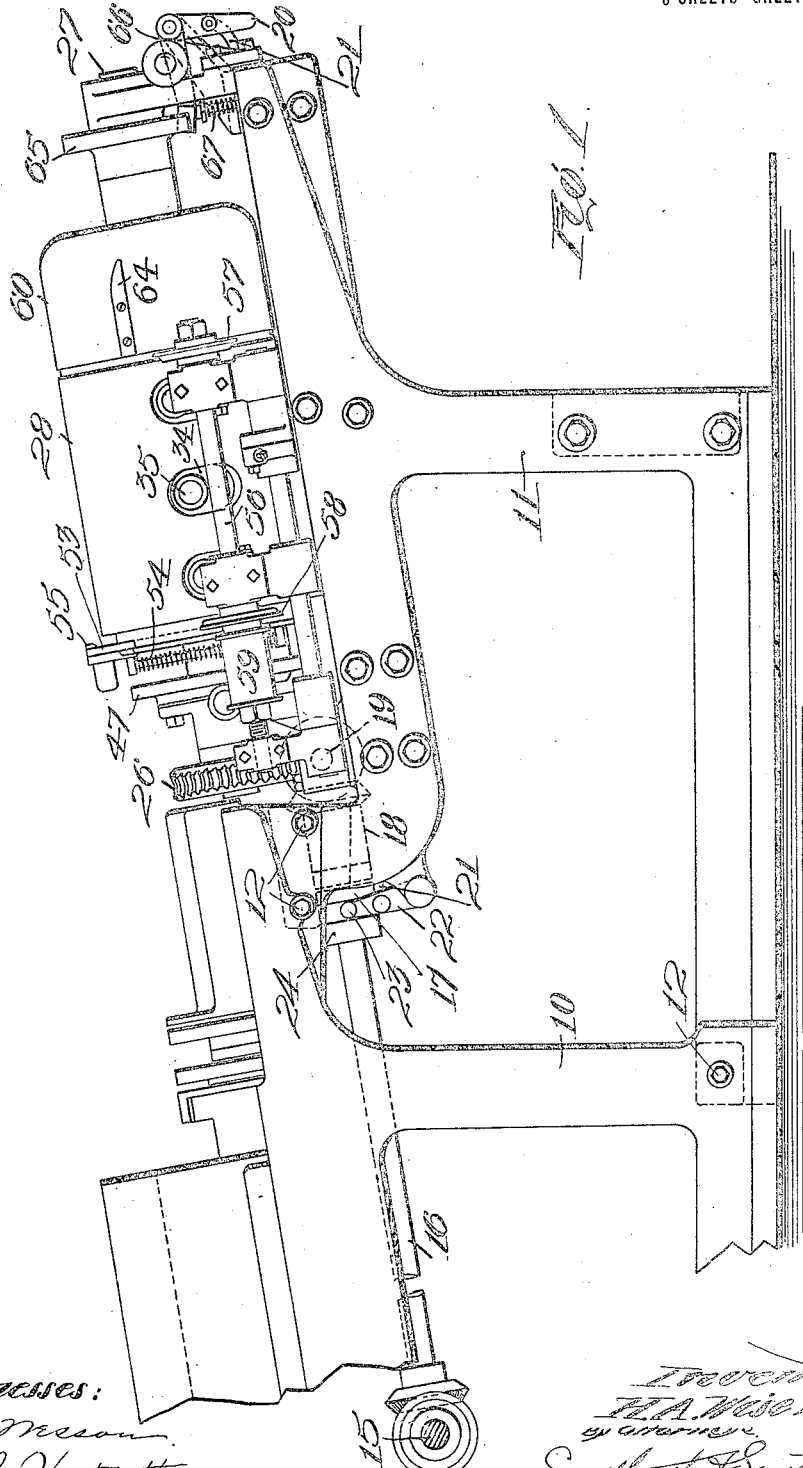

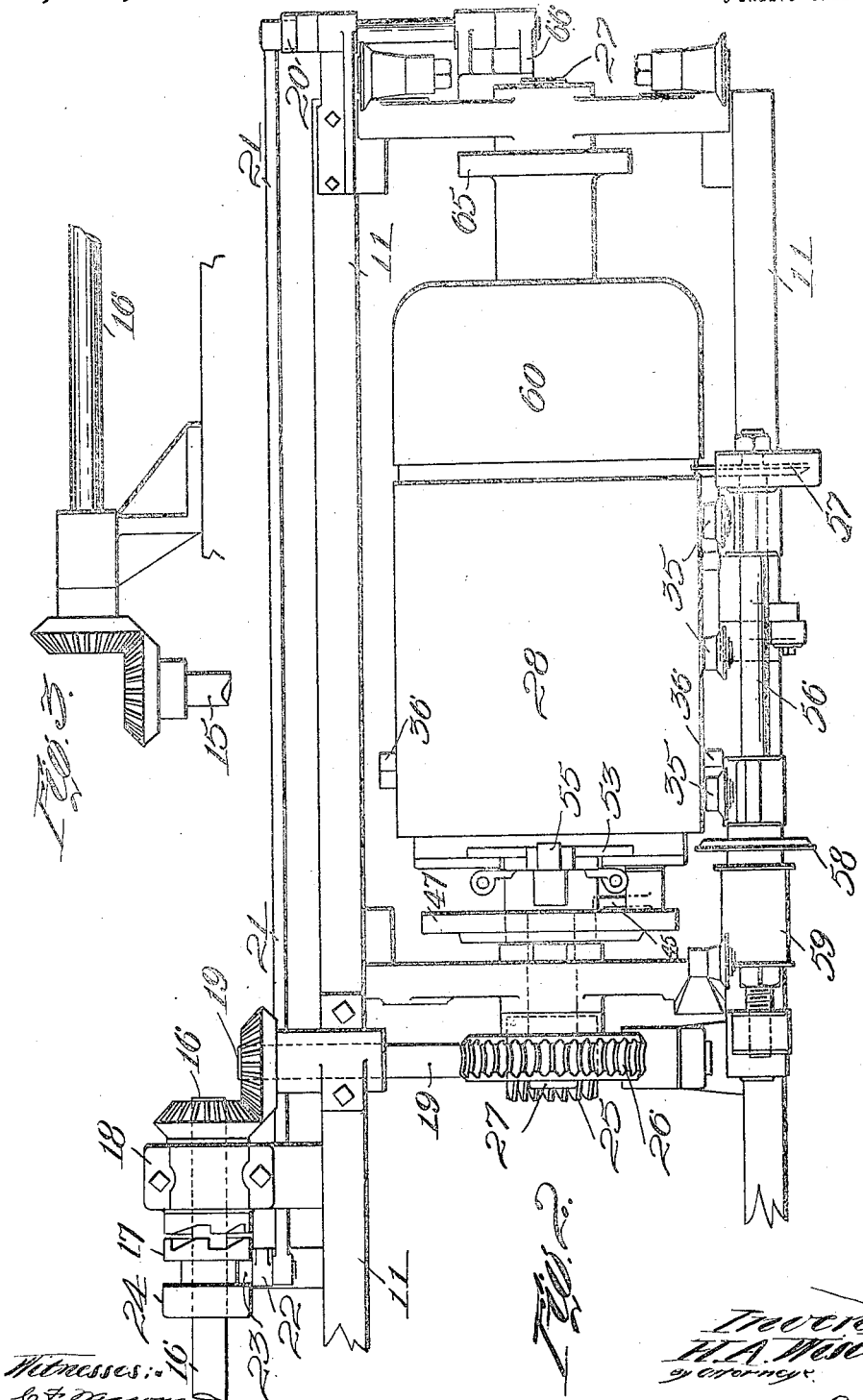

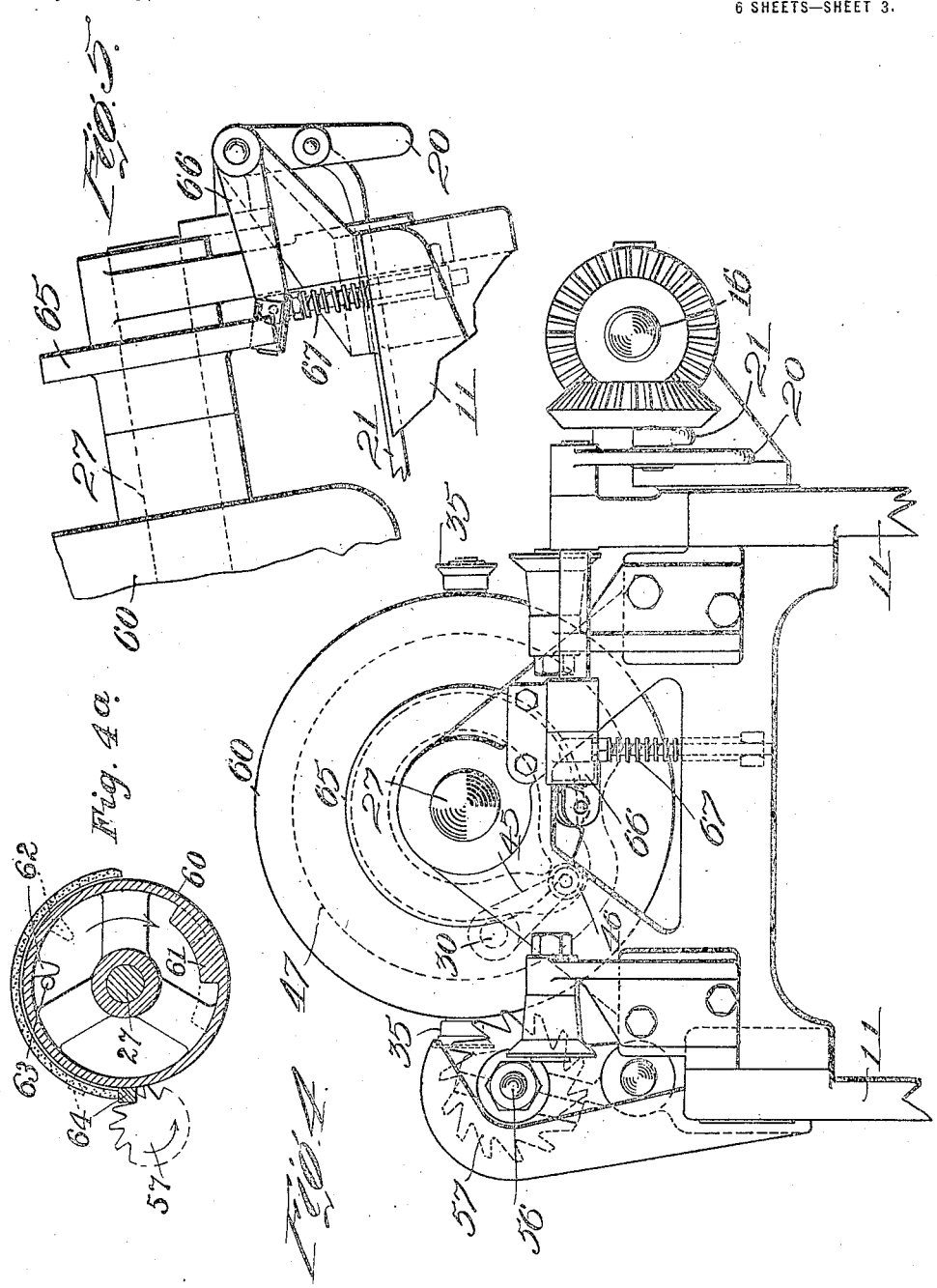

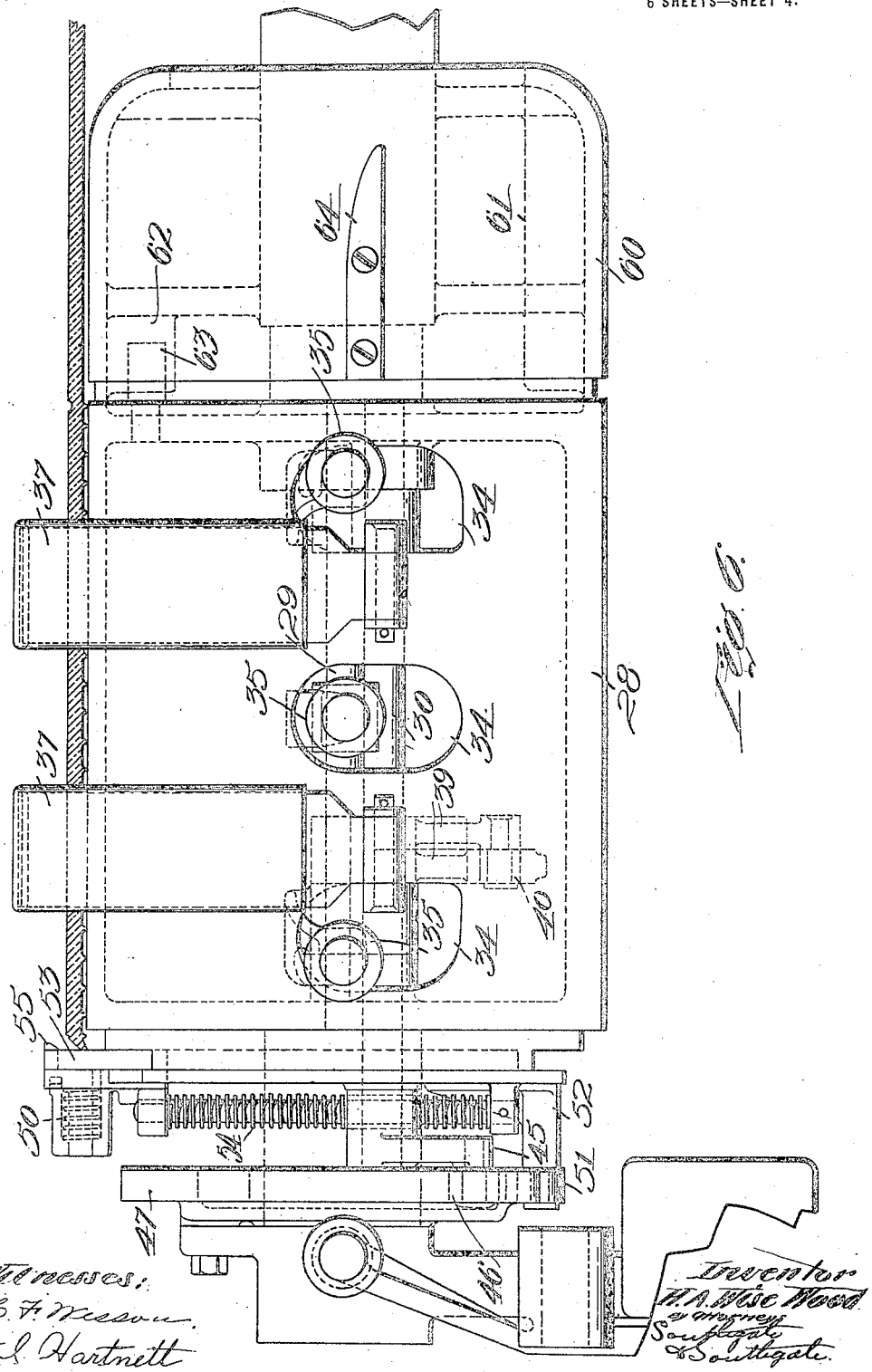

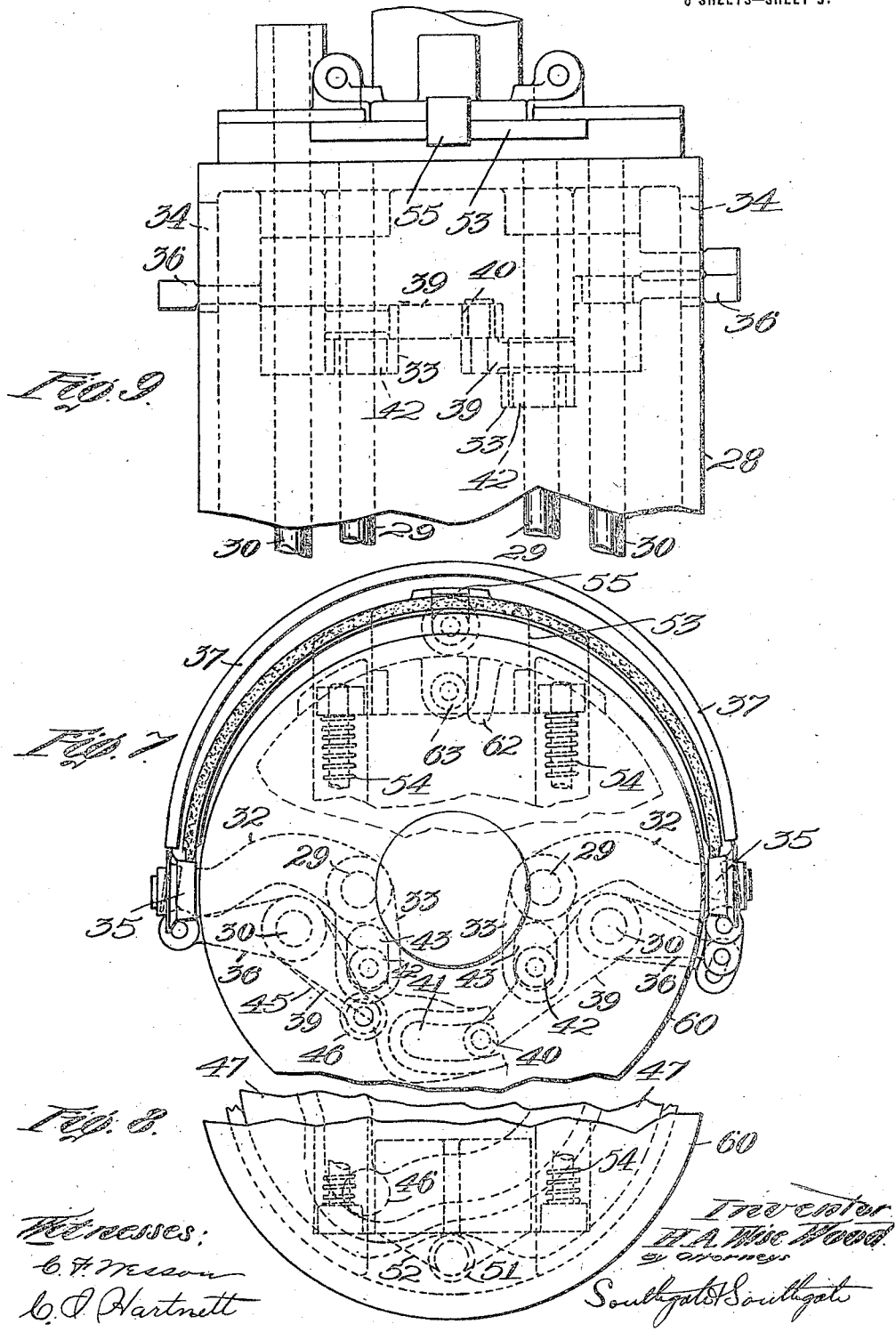

UNITED STATES PATENT OFFICE.

HENRY A. WISE WOOD, OF NEW YORK, N. Y., ASSIGNOR, BY MESNE ASSIGNMENTS, TO WOOD NEWSPAPER MACHINERY CORPORATION, OF NEW YORK, N. Y., A CORPORATION OF VIRGINIA.

STEREOTYPE-PLATE-FINISHING MACHINE.

1,281,115.  Specification of Letters Patent.  Patented Oct. 8, 1918.

Application filed October 23, 1909, Serial No. 524,237. Renewed June 24, 1918. Serial No. 241,694.

*To all whom it may concern:*

Be it known that I, HENRY A. WISE WOOD, a citizen of the United States, residing at New York, in the county of New York and State of New York, have invented a new and useful Stereotype-Plate-Finishing Machine, of which the following is a specification.

This invention relates to a stereotype plate finishing machine.

The principal objects thereof are to provide a simple and practicable attachment for cutting the tails or risers and trimming the edges of the plates as they are delivered from the casting device; to provide means whereby when an untrimmed plate is placed in position on the machine and the machine put in motion, the plate will be automatically clamped to the surface of a movable plate support; to provide means whereby the motion of this element with the plate thereon will bring the latter into engagement with cutting saws which will cut off the tail or riser and trim the circular edges of the plate, so that one plate is cut or trimmed at each revolution; to provide means whereby the device on which the plate is supported will stop automatically at the completion of each revolution and the plate will be unclamped automatically so that it can be removed therefrom or can slide out of it by its own weight; and to provide practicable and efficient means whereby the severed tail or riser will be automatically delivered from the machine.

Further objects and advantages of the invention will appear hereinafter.

Reference is to be had to the accompanying drawings in which,

Figure 1 is a side elevation of one embodiment of this invention applied to a gravity shaving machine.

Fig. 2 is a plan of a portion thereof.

Fig. 3 is a plan of a detail.

Fig. 4 is an end elevation of the machine.

Fig. 4ª is a transverse sectional view of the tail cylinder.

Fig. 5 is a side elevation of part of the starting mechanism on an enlarged scale.

Fig. 6 is a side view on an enlarged scale of the means for supporting and carrying the plate, showing a plate in position and in section.

Fig. 7 is an end view of the same with the plate in the position which it first assumes.

Fig. 8 is a fragmentary end view of the controlling cam.

Fig. 9 is a fragmentary plan of a portion of the mechanism.

Fig. 10 is an end elevation showing the parts in another position, in which they have made one-quarter of a revolution from the position shown in Fig. 7, and Fig. 11 is a plan thereof.

Although the invention is capable of general use, it is illustrated herein as applied to the so-called gravity type, of stereotype finishing machines in which the frame 10 for supporting the finishing mechanism and other parts has an inclined run-way down which the plate is adapted to pass. For the purpose of connecting the device with such a machine, a frame 11 is provided constituting substantially an extension of the frame 10 and connected therewith by means of bolts 12. In this instance, the frame 11 is provided with an upper portion located on an incline so that the plate can be fed through it by gravity.

The driving shaft 15 of the finishing machine constantly rotates a longitudinal shaft 16. Splined on the shaft 16 is one member of a clutch 17, the other member of which is supported by a bearing 18. The shaft 16 is free to rotate in the last named member of the clutch which is connected to operate a shaft 19. This clutch is operated by a starting lever 20 by which a link 21 is moved. This link operates a lever 22 which has a projecting roll 23 extending into a groove between the sliding section of the clutch 17 and a collar 24 connected therewith. In this way the clutch members are put into connection with each other so that the shaft 19 will be operated continuously until the clutch is thrown apart.

The shaft 19 is provided with a worm 25 operating a worm-wheel 26 on a longitudinal main shaft 27. On this shaft is fixed a plate cylinder 28 for supporting the stereotype plate. Supported by the plate cylinder are a pair of longitudinal plate roll rock shafts 29, one at the front and the other at the rear. Also mounted within the plate cylinder are front and rear clamp rock shafts 30. All these shafts are mounted in bearings at the ends of the cylinder and revolve with it. On the plate roll shafts are mounted plate roll arms 32 and plate roll arm shaft levers 33. The arms extend forwardly from the front shaft and rearwardly from the rear one, through openings 34 in the wall of the plate cylinder. On the outer ends are located rolls 35 for supporting the edges of the printing plate when it is placed in the machine. Mechanism is provided, as will be described hereinafter, for drawing back these rolls so as to bring the plate directly on the cylinder.

Keyed on the front and rear clamp shafts 30 are plate clamp arms 36 extending through the openings 34, and connected with the ends of plate clamping straps 37. Also keyed on the clamp shafts 30 are clamp shaft levers 39. On the rear clamp shaft lever is a roll 40 which is designed to work in an arcuate slot 41 in the end of the front clamp shaft lever. This construction causes these levers to work in unison so as to turn the respective plate clamp arms through similar and equal arcs. These levers also are connected with the plate roll arm shaft levers 33 by means of rolls 42 which engage in slots 43 thereon. The front clamp shaft which carries the levers 39 extends through the delivery end of the cylinder 28 and has thereon a plate clamp cam roll lever 45. This cam roll lever carries a cam roll 46 which runs in a groove on a fixed plate stop cam 47.

On the edge of the plate stop cam 47 runs a cam roll 51 mounted on a bracket 52. This bracket is attached to the bottom of a plate stop 53. This plate stop is normally held out by light springs 54 and it is provided with a movable latch 55 pressed by a spring 50 toward the receiving end of the machine. The plate stop rotates with the cylinder.

At one side of the plate cylinder is journaled a shaft 56 carrying a tail cutter 57, a trimming saw 58, and a driving pulley 59. The pulley is driven by a belt (not shown).

It will be observed that the plate cylinder 28 supports the plate but that it is long enough only to carry the part which is to be preserved and the tail or riser projects from it. At the end of a plate cylinder is a tail cylinder 60 free to rotate on the plate cylinder shaft. This tail cylinder has a weight 61 preferably on the inside thereof which tends of course to swing around to the bottom when there is no force to prevent such a motion. On the inside of the tail cylinder is a cast projection 62 with which a pin 63 on the plate cylinder engages as the plate cylinder rotates so that the tail cylinder is driven by the plate cylinder during a portion of the revolution. On the tail cylinder is a tail driving plate 64 for receiving the edge of the plate when it is introduced into the machine, guiding it to the rolls, and driving the tail when it has been severed from the plate.

At the end of a revolution the machine is stopped automatically by a cam 65 on the main shaft 27. This cam operates an arm 66 which is fixed to the shaft that carries the starting lever 20 and throws the clutch open. A spring 67 keeps the arm against the cam.

The operation of the machine is as follows:—

The parts being in the position shown in Figs. 1, 2, 6 and 7, a stereotype printing plate is introduced into the machine, on the tail driving plate 64 and is then pushed back on the upper pair of rolls 35. It is then rolled along on the rolls under the clamp straps 37 until it strikes the plate stop 53. In this position the stereotype plate rests on the several rolls 35 which hold it up out of contact with the plate cylinder 28 and tail cylinder 60. To put the machine into operation, the operator throws the lever 20 thus placing in mesh the clutch members 17. This starts the shaft 19 and it is then driven by the shaft 16 of the shaving machines. This starts the plate cylinder 28 and the pin 63 starts the tail cylinder so that both these cylinders then revolve together. As the plate cylinder revolves, the plate rolls 35 are lowered so as to leave the printing plate resting on the cylinder 28. The clamp straps 37 are simultaneously lowered and caused to clamp the stereotype plate to the plate cylinder. This is accomplished as follows:—

The cam roll 46 is shown in Fig. 8 as on the high throw of the stationary cam 47 so that the clamps 37 and plate rolls 35 are in the highest position, as indicated above. When the clutch members are thrown into mesh and the plate cylinder starts to revolve, the cam roll 46 immediately drops off the high dwell of the cam 47 on the low dwell so that the lever 45 turns the clamp shafts 30 to lower the plate clamps. At the same time the rolls 42 are caused to move upwardly in the slots 43 so as to lower the plate rolls 35. The parts at the front of the cylinder are operated directly while those at the rear are operated by means of the roll 40 as explained above. This brings the parts into position shown in Figs. 10 and 11.

When the machine is at rest in the position shown in Fig. 7 and in dotted lines in Fig. 4ª, the cam roll 51 is on the low dwell of cam 47 which causes the plate stop 53 to remain in its highest position so as to receive and stop the plate when placed on the machine. When a plate is placed on the tail cylinder the left-hand lower edge is rested on part 64. The weight of the plate thus placed causes the tail cylinder to turn back until projection 62 is in contact with pin 63 of the plate cylinder as shown by full lines in Fig. 4ª. The clutch is then thrown into mesh, which clamps the plate to the cylinder, and starts the rotation of the cylinder in the direction shown by the arrow. At this time the plate cylinder 28 is driving the tail cylinder 60 by means of the contact between parts 63 and 62. As the cylinder starts to revolve toward the position shown in Fig. 10, the cam roll 51 passes to the high dwell of the cam and causes the plate stop 53 to drop down below the plate so as to clear the trimming saw 58. As the plate stop drops to its lower position, the spring plate stop latch 55 slides down over the edge of the plate and then back underneath it. As the cylinder stops after having completed a revolution, the springs 54 normally tend to raise the plate stop to its highest position but this is prevented by the stereotype plate itself which is over the latch. As soon as the plate has been delivered from the machine on the saddle of the finishing machine, the plate stop springs thrust the plate stop up to receive and stop the next plate.

The tail is cut during the last half revolution and the plate is trimmed during one revolution of the main shaft. After this has been accomplished the plate cylinder is stopped by means of the cam 65. The counter-balance weight 61 by this time has passed beyond its upper-most position and is on the way down so it keeps the tail cylinder in motion after the plate cylinder has stopped. This motion causes the tail driving plate 64 to carry the severed tail or riser over to one side. It then slides off the tail cylinder and drops into a chute (not shown) by which it is guided through an opening in the rear side of the frame to the floor. The device is then ready to receive another plate.

While I have shown and described an embodiment of the invention particularly adapted for use in connection with a gravity shaving machine, I am aware that the invention is capable of general use and that it can be carried out in many other forms than that shown and described without departing from the scope of the invention as expressed in the claims.

Therefore, I do not wish to be limited to the particular embodiment illustrated or to the details of construction shown, but what I do claim is:—

1. The combination with a stereotype printing plate finishing machine having a frame, of means for cutting the tails from the stereotype plates, a frame for supporting said means connected with the plate finishing machine frame, and means for operating the tail cutting means from the plate finishing machine.

2. The combination with a stereotype printing plate finishing machine, of a separately supported tail cutting mechanism, means connected with the plate finishing machine for operating the tail cutting mechanism, and means connected with the tail cutting mechanism for throwing it out of operative connection with the finishing machine.

3. The combination with a gravity finishing machine for stereotype printing plates having an inclined run-way, of means for cutting the tails from the stereotype plates, having an inclined run-way, and means for coupling the tail cutting means with the plate finishing machine, whereby said tail cutting means will be operated by the finishing machine.

4. The combination with a gravity finishing machine for stereotype printing plates having an inclined run-way, of means for cutting the tails from the stereotype plates, having an inclined run-way substantially in line with the run-way of the finishing machine.

5. The combination with a gravity stereotype printing plate finishing machine provided with a supporting frame having an inclined top, a frame located adjacent thereto and connected with the plate finishing machine at the bottom, said frame projecting rearwardly from the plate finishing machine frame and having an inclined top connected with the rear end of the top of the plate finishing machine frame, and means supported by the second frame for trimming the rear edges of the stereotype plates.

6. In a machine of the character described, the combination of a frame having an inclined top and a horizontal bottom projection, a receiving frame engaging the end of the horizontal projection and held by it in position and having a rear upper projection engaging the lower end of the inclined frame.

7. In a machine of the character described, the combination of a frame having an inclined top, a power shaft having a clutch thereon, a shaft adapted to be connected to the power shaft by the clutch, means connected with the last named shaft for rotating a printing plate, a cutter in position for cutting the tail from the printing plate as it is rotated, and means on said frame for operating the clutch.

8. In a machine of the character described, the combination of a main shaft, a clutch thereon, a second shaft adapted to be connected with the main shaft by the clutch, means connected with the second shaft for rotating a printing plate, a lever having means connected therewith for operating the clutch, a cam on the second shaft, and means connected with said cam for throwing the lever to open the clutch at the end of a complete revolution.

9. In a machine of the character described, the combination of a power shaft, a clutch thereon, a second shaft adapted to be connected to the power shaft by the clutch, means carried by the second shaft for supporting a printing plate, a cam on the second shaft, a starting lever having connections with the clutch for closing it and having a projection engaging said cam and adapted to be moved by the cam when on the high dwell into a position for opening the clutch, and a spring for holding the said arm against the cam face.

10. In a machine of the character described, the combination of a rotary shaft adapted to support a printing plate, a lever, means connected with said lever for starting said shaft, means whereby the shaft will be automatically stopped upon completing a single revolution, a cutter mounted in position to cut the tail from a printing plate during the rotation of the shaft, and means rotatable with the shaft for receiving the plate when it is placed in the machine.

11. In a machine of the character described, the combination of a rotary shaft adapted to support a printing plate, a lever, means connected with said lever for starting said shaft, and means whereby the shaft will be automatically stopped upon completing a single revolution.

12. In a machine of the character described, the combination of a rotary shaft, a tail cutter arranged adjacent thereto, and rolls rotatable with the shaft for supporting the edges of a stereotype printing plate in position to be operated on by the tail cutter.

13. In a machine of the character described, the combination of a rotary shaft, two series of rolls mounted to rotate with the shaft for supporting a printing plate, and means for moving said rolls simultaneously toward one side of the shaft.

14. In a machine of the character described, the combination of a rotary cylinder having bearings thereon, a longitudinal rock shaft mounted in said bearings, means for rocking said shaft, arms carried by said shaft, and means mounted on said arms for supporting the edge of a printing plate.

15. In a machine of the character described, the combination of a rotary cylinder having bearings thereon, rock shafts mounted on said bearings, means for rocking said rock shafts as the cylinder rotates, arms carried by said shafts, and rollers for supporting the edges of the printing plate mounted on the arms.

16. In a machine of the character described, the combination of a rotary plate cylinder, rock shafts supported by and rotatable with said cylinder, levers fixed to said rock shafts and projecting through the walls of the cylinder, and rolls carried by said levers outside the cylinder for supporting the printing plates.

17. In a machine of the character described, the combination of a rotary plate cylinder, rock shafts supported by and rotatable with said cylinder, levers fixed to said rock shafts and projecting through the walls of the cylinder, rolls carried by said levers outside the cylinder for supporting the printing plates, means for automatically stopping the rotation of said cylinder at a definite point during its rotation, and means whereby when the cylinder is started said rolls will be moved simultaneously to bring the printing plate supported thereby into close contact with the cylinder.

18. In a machine of the character described, the combination of a rotary plate cylinder, rock shafts supported by and rotatable with said cylinder, levers fixed to said rock shafts and projecting through the side of the cylinder, means carried by said levers outside the cylinder for supporting the printing plates, means for automatically stopping the rotation of said cylinder at the end of a complete rotation, means whereby when the cylinder is started said supporting means will be moved simultaneously to bring the printing plate supported thereby into close contact with the cylinder, a second set of rock shafts supported by the cylinder, levers thereon projecting through the cylinder, clamps carried by said levers, and means for operating the last named rock shafts to draw the clamps into clamping position when the plate moves into contact with the cylinder.

19. In a machine of the character described, the combination of a rotary shaft, a cylinder fixed thereon, two pairs of rock shafts rotatable with the cylinder, levers on each of said shafts projecting through the cylinder, means on the levers connected with one pair of shafts for supporting the edges of the printing plate, clamps for clamping the printing plate to the cylinder connected with the other set of levers, means for automatically stopping the shaft at a definite point in its revolution, and means whereby when the shaft is again started, all of said shafts will be rocked in such direction as to draw the outer ends of the levers in a direction away from the center of the plate supported by said supporting means, whereby the plate will be moved against the cylinder and the clamps will secure it thereto.

20. In a machine of the character described, the combination of a rotary shaft, a cylinder fixed thereon, two pairs of rock shafts rotatable with the cylinder, levers on each of said shafts projecting through the cylinder, rolls on the levers connected with one pair of shafts for supporting the edges of the printing plate, and clamps for clamping the printing plate to the cylinder connected with the other set of levers.

21. In a machine of the character described, the combination of a rotary shaft, a plate cylinder rotatable therewith, supports for the plate carried by the cylinder, clamps carried by the cylinder for clamping the plate thereto, and means for simultaneously moving said supports circumferentially in a direction to permit the plate to rest on the cylinder and moving the clamps into operative position.

22. In a machine of the character described, the combination of a rotary shaft, a plate cylinder rotatable therewith, supports for the plate carried by the cylinder, clamps carried by the cylinder for clamping the plate thereto, a stationary cam for simultaneously moving said supports circumferentially in a direction to bring the plate to rest on the cylinder and moving the clamps into operative position, a movable plate stop near one end of the cylinder, and means operated simultaneously with said cam for moving the plate stop in and out of operative position.

23. In a machine of the character described, the combination of a rotary plate cylinder, rock shafts supported by and rotatable with said plate cylinder, levers fixed to said rock shafts and projecting through the walls of the cylinder, and means carried by said levers and movable circumferentially for clamping a printing plate to the cylinder.

24. In a machine of the character described, the combination of a rotary shaft, a cylinder carried thereby and having bearings thereon, rock shafts mounted on said bearings in the cylinder and projecting outwardly therefrom, means for rocking said rock shafts as the rotary shaft rotates, arms carried by said shafts, and means connected with said arms for clamping a printing plate to the cylinder.

25. In a machine of the character described, the combination of a rotary cylinder having bearings in the ends thereof, rock shafts in the cylinder mounted in said bearings, and means carried by said rock shafts and movable circumferentially for clamping a printing plate to the cylinder.

26. In a machine of the character described, the combination of a rotary shaft, a support for a stereotype printing plate, and means carried with the shaft and movable circumferentially for clamping a printing plate to said support.

27. In a machine of the character described, the combination of a rotary plate cylinder, longitudinal rock shafts supported thereby and having levers mounted thereon and projecting beyond the walls of the cylinder, means carried by said levers outside the cylinder for supporting the printing plates, and means whereby when the cylinder is started said levers will be moved to bring the printing plate supported thereby into contact with the cylinder.

28. In a machine of the character described, the combination of a rotary support for the printing plate, a movable stop for the plate located on, and rotatable with, the support, means for rotating the support, and means connected with the rotating means for operating the stop.

29. In a machine of the character described, the combination of a rotary support for a printing plate, means for clamping a plate thereon, a plate stop located adjacent to the end of said support and rotatable therewith, and means for moving the stop to a position in the path of the plate before said clamping means operates.

30. In a machine of the character described, the combination of a rotary plate support, a stop rotatable therewith, and means for holding the stop against the inner side of the plate while it is on the support, whereby when the plate moves past it the stop will be in position to stop the next plate.

31. In a machine of the character described, the combination of a rotary support for the printing plate, a movable stop for the plate, resilient means for forcing said stop out into operative position, positive means for moving said stop inwardly out of the path of the plate, and a latch on the stop having a spring for forcing it in under the edge of the plate when the stop is withdrawn.

32. In a machine of the character described, the combination of a plate support, a stop therefor movable past the advancing edge of the plate, a latch movably mounted on the stop and having a beveled edge, whereby as the stop is withdrawn, the latch will recede and pass over the edge of the plate, and whereby when the stop is inside the path of the plate the latch will be forced out under the edge of the plate and will be held in that position by the plate.

33. In a machine of the character described, the combination of a support for the printing plate, a movable stop for the plate, means for forcing said stop out into operative position, means for moving said stop inwardly out of the path of the plate, and a latch on the stop having a spring for forcing it in under the edge of the plate when the stop is withdrawn.

34. In a machine of the character described, the combination of a rotatable support for a printing plate, movable means on the support for receiving the edges of the plate, a stop rotatable with said support for limiting the position of the plate on the support, means for clamping the plate on the support, means whereby the stop is withdrawn after the plate is clamped in position and kept out of the way until the plate is discharged, and a cutter for operating on the plate.

35. In a machine of the character described, the combination of a support for a printing plate, a series of anti-friction rolls mounted thereon in an inclined plane for supporting the edges of the printing plate, a rotary stop for arresting the plate in a predetermined position on the support, means for automatically clamping the plate on the support, means for withdrawing the stop when the plate is clamped, means for preventing the stop from moving into stopping position after it is withdrawn until the plate is unclamped and discharged down the inclined plane, and means for operating on the plate.

36. In a machine of the character described, the combination of a rotary support for stereotype printing plates, an independently rotatable support for the tails of said plates, a tail driving plate on the tail support for receiving the front edge of the printing plate as it is placed in the machine, and means on the plate support for receiving the edges of the plate.

37. In a machine of the character described, the combination of a rotary plate support, a tail support rotatable on the same axis, means on the plate support for causing the tail support to rotate therewith during a part of the revolution, and means on the tail support whereby when the plate support stops the rotation of the tail support is continued for a part of a revolution.

38. In a machine of the character described, the combination of a rotary plate cylinder, a tail cylinder independently rotatable on the same axis and located at the end thereof, means on the plate cylinder for causing the tail cylinder to rotate with it during part of a revolution, means for cutting the tail from the printing plate as it is rotated, and means whereby when the plate cylinder is stopped the tail cylinder will continue its rotation far enough to discharge the severed tail therefrom.

39. In a machine of the character described, the combination of a rotary plate cylinder, having a pin projecting therefrom, a tail cylinder independently rotatable on the same axis having a projection against which said pin is adapted to engage, whereby the tail cylinder will be rotated with a plate cylinder during a part of a revolution, said tail cylinder having a weight thereon for causing the tail cylinder to continue its rotation after the plate cylinder has stopped.

40. In a machine of the character described, the combination of a rotary plate cylinder, having a pin projecting therefrom, a tail cylinder independently rotatable on the same axis having a projection against which said pin is adapted to engage, whereby the tail cylinder will be rotated with a plate cylinder during a part of a revolution, means for automatically stopping said plate cylinder at the end of a revolution in a position in which the weight of the tail cylinder has passed the upper part of its arc and is descending, whereby said weight will cause said plate cylinder to continue its descent during a part of its revolution for the purpose of delivering a plate which rests thereon.

41. In a machine of the character described, the combination of a rotary plate cylinder, a tail cylinder independently rotatable on the same axis and located at the end thereof, means on the plate cylinder for causing the tail cylinder to rotate with it during part of a revolution, and means for cutting the tail from the printing plate as it is rotated.

42. In a machine of the character described, the combination of a rotary plate support, a tail support rotatable on the same axis, and means on the plate support for causing the tail support to rotate therewith during a part of the revolution.

43. The combination with a rotary plate support, of a member independently rotatable on the same axis and adapted to be carried part way around by the plate support for carrying the tail of the plate.

44. The combination with a rotary plate support, of a member independently rotatable on the same axis for carrying the tail of the plate, and having means for engaging and driving the tail independently of the plate support.

45. In a machine of the character described, the combination of a rotary plate support, a tail support, means for rotating the tail support with the plate support, and means for rotating the tail support when the plate support has stopped.

46. In a machine of the character described, the combination of a rotary stereotype printing plate support, and separate rotary means for supporting the tail of the plate.

47. The combination with a stereotype plate finishing machine having a frame, of means for cutting the tails from the stereotype plate, means for supporting a tail cut off by said tail cutting means, and means for operating the tail cutting means from the plate finishing machine.

48. The combination of a frame, a plate cylinder mounted in bearings thereon, a tail driving plate in front of the cylinder, a stop placed out of the general path of a plate to be operated on, and cutters for trimming the plate and severing the gate portion from the body thereof.

49. In a machine of the character described, the combination of a shaft, a clutch thereon, a second shaft adapted to be connected with the main shaft by the clutch, means connected with the second shaft for rotating a printing plate, a lever having means connected therewith for operating the clutch, a cam on the second shaft and means connected with said cam for throwing the lever to open the clutch at the end of complete revolution.

50. In a machine of the character described, the combination of a power shaft, a clutch thereon, a second shaft adapted to be connected to the power shaft by the clutch, means connected to the second shaft for supporting a printing plate, a cam on the second shaft, a starting lever having connections with the clutch for closing it and having a projection engaging said cam and adapted to be moved by the cam for opening the clutch, and a spring for holding the said projection against the cam.

In testimony whereof I have hereunto set my hand, in the presence of two subscribing witnesses.

HENRY A. WISE WOOD.

Witnesses:
M. G. HOLDEN,
ANNIE B. WALTERS.

Copies of this patent may be obtained for five cents each, by addressing the "Commissioner of Patents, Washington, D. C."